United States Patent [19]

Jolin

[11] 4,436,350
[45] Mar. 13, 1984

[54] HOUSING AND RELATED MOUNTING SYSTEM FOR STEREO SYSTEMS ON MOTORCYCLES

[76] Inventor: Bart Jolin, 2265 W. Broadway Apt. H-101, Anaheim, Calif. 92804

[21] Appl. No.: 236,503

[22] Filed: Apr. 10, 1981

[51] Int. Cl.³ .................. A47B 81/06; A47B 96/06; B62J 7/00
[52] U.S. Cl. .................................. 312/7.1; 312/7.2; 248/230; 224/41
[58] Field of Search .................. 312/7.1, 7.2, 242; 248/359, 230, 231; 224/30 A, 41, 40

[56] References Cited

U.S. PATENT DOCUMENTS

| | | | |
|---|---|---|---|
| 1,284,010 | 11/1918 | Wilbur | 248/230 |
| 2,391,945 | 1/1946 | Christenson | 224/41 |
| 2,449,426 | 9/1948 | Strauss | 248/230 |
| 2,535,112 | 12/1950 | Woody | 248/230 |
| 2,588,671 | 3/1952 | Tringali | 224/41 |
| 3,090,462 | 5/1963 | Huff et al. | 312/7.1 |
| 3,112,968 | 12/1963 | Cotton et al. | 312/7.2 |
| 3,346,280 | 10/1967 | Pfaff, Jr. et al. | 248/231 |
| 3,598,295 | 8/1971 | Seegers | 224/41 |
| 3,735,041 | 5/1973 | Fujita | 312/7.2 |
| 3,810,559 | 5/1974 | Stanton | 224/41 |

Primary Examiner—Victor N. Sakran

[57] ABSTRACT

A housing and mounting system for the mounting of stereo radios, mobile communication broadcasting system (C.B.) and the like on motorcycles is provided which comprises a plastic housing unit suitably shaped to contain the stereo or other unit with speakers and other such devices, said housing unit containing two lower housing brackets comprising a channel with suitable holes for containment of tightening nuts and bolts. Two support rods are inserted in each of the housing brackets and are pivotably connected. The housing may be easily removed from the motorcycle by loosening the nut and bolt assembly, then removing the housing from the support rod. The position of the housing unit can be easily adjusted by rotating the support rod about the handlebar bracket system; moving the support rod up or down the handlebar bracket system; and/or by moving the housing bracket along the support rod. The novel housing and mounting system provides increased stability for a stereo radio unit mounted to a motorcycle and has the advantage that it can be easily removed and positioned.

4 Claims, 7 Drawing Figures

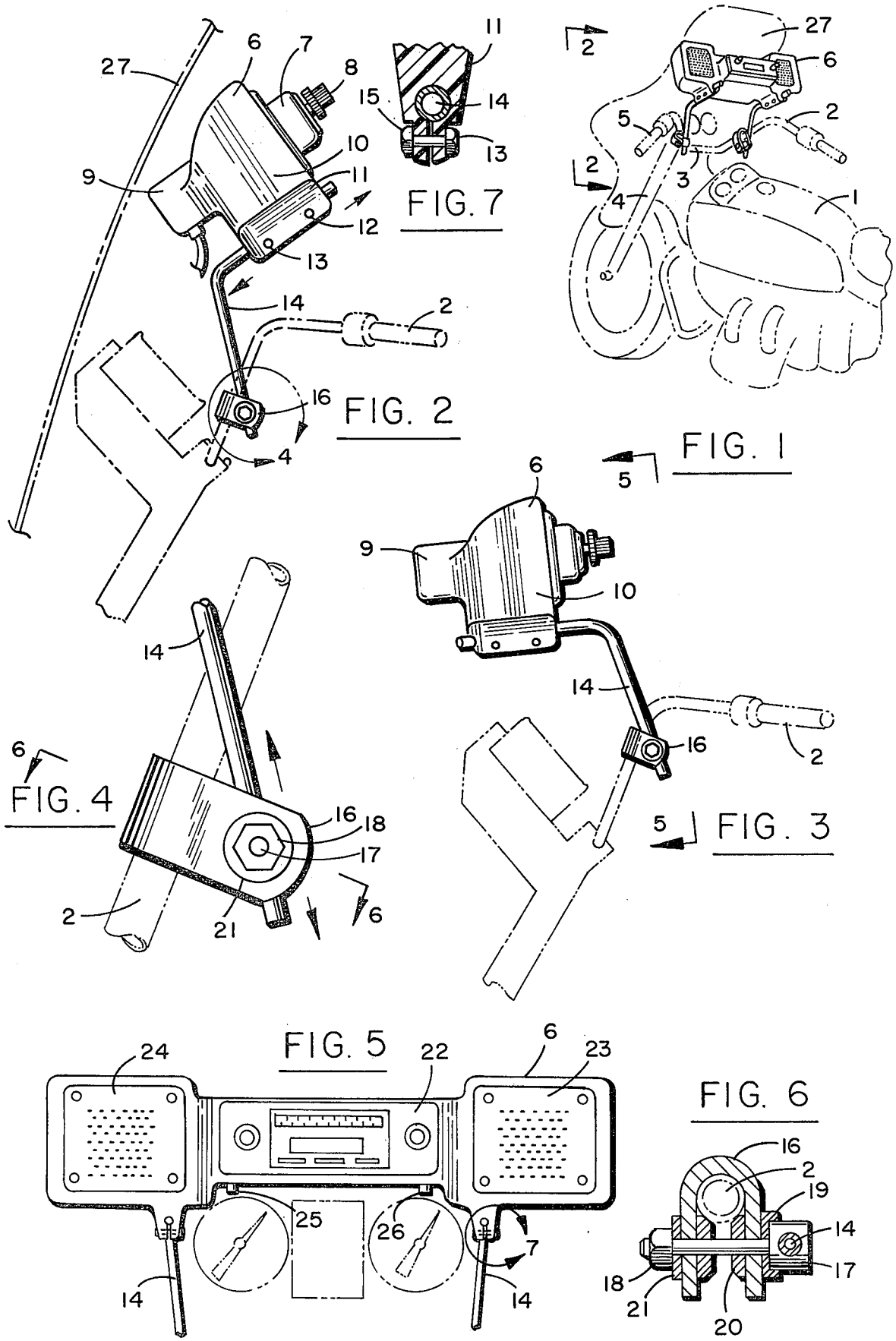

HOUSING AND RELATED MOUNTING SYSTEM FOR STEREO SYSTEMS ON MOTORCYCLES

INTRODUCTION

Use of motorcycles has greatly increased in the last several years due in great part to the need for efficient transportation. Motorcycles are becoming larger, more complex, and there is greater demand for auxiliary units such as radio, C.B., stereos and the like on the motorcycle. Stereo and C.B. Units cannot simply be strapped on a motorcycle due to the fact that movement of the cycle results in maladjustment of the tuning and many stereo units are heavy and need support and protection from the elements. Accordingly, there is a great need for a practical housing unit that can provide stability and support to stereo units yet can be easily removed from the motorcycle. Also, there is a need for a support and housing device that does not block motorcycle speedometers and tactometers and the like from the user.

Accordingly, one object of the invention is to provide an ample housing for a stereo, radio, C.B. or other such related units. Another object of the invention is to provide a housing an mounting assembly wherein the stereo unit can be easily removed from the motorcycle. Other objects of the invention will be seen from the following description.

THE DRAWINGS

FIG. 1 shows an overall view of a motorcycle to which is mounted the stereo unit.

FIG. 2 is a sideview of the invention showing details of the unit.

FIG. 3 depicts the housing unit in a different position than that shown in FIG. 2.

FIG. 4 shows the details of the handlebar bracket assembly.

FIG. 5 shows a front view of the stereo unit depicting a radio, and two speakers.

FIG. 6 shows a detail of the handlebar bracket assembly.

FIG. 7 shows a detail of the housing bracket assembly.

DESCRIPTION OF THE INVENTION

The invention comprises essentially a plastic hollow housing unit containing two or more novel lower housing mounted bracket units to it. A preferred embodiment is the housing unit utilizing two or more support means inserted into the two bracket units and connected to a handlebar bracket assembly which is connected to the handlebars of the motorcycle. Into the housing mounting brackets are inserted two or more bent or unbent rods, the mounting brackets are tightened with appropriate nuts and bolts for a tight fit to the rods. The rods, which are generally bent as shown, are connected handlebar mounting bracket assemblies which, with appropriate nuts and bolts and other standard devices are connected to the handlebars of the motorcycle. The rod and thus the housing unit may be positioned at a great number of locations about the handlebars by either moving the rod up and down the handlebar bracket assembly or by rotating the rod about the handlebar bracket. Also, the housing unit may be located at several points along the support rod by moving the support rod up or down the housing mounting bracket.

FIG. 1 is an overall view of the motorcycle and invention. The motorcycle 1 is shown with a standard right handlebar 2 with lower handlebar 3 and left handlebar 5 shown, all supported by a fork 4, connected to the front wheel. Supported on the handlebar is the housing 6. Housing 6 is a hollow piece, preferably made of plastic, preferably polyurethane and which can be easily molded to any specified shape or configuration. Shown for illustration purposes is a housing unit to contain a stereo unit comprising of a radio and two speakers which are separated from one another. The unit can also include an antenna which can be enclosed within the housing unit or which can be outside the housing unit.

FIG. 5 shows a greater detail of the housing unit 6 which contains a radio 22 and two speakers 23 and 24. Shown are recess element 25 and 26 which are holes or receptacles to the plastic mold of the housing. Power cables to connect the radio to a battery source contained in the motorcycle are shown as 25 and receptacle 26 can serve to allow cables for a stereo headphone set to escapte from the housing to the operator of the motorcycle. Also shown as a part of the hollow mold is a lower mounting bracket portion to which is inserted rod 14 and which will be described in more detail herein.

FIG. 2 shows a sideview of the detail of the invention wherein the stereo housing unit is shown with a windshield such that the housing unit is towards the operator of the vehicle and between the operator and the windshield as generally depicted in FIG. 1. FIG. 3 shows the same elements and the housing unit except that there is no windshield and thus the housing unit is in an "away" postion from the driver. The housing unit is thus adjustable and the operator can insure that the housing unit does not block his view of the critical instruments and that there is a clear view of the critical instruments such as the speedometer and tackometer. As will be described herein, the housing unit can be positioned in a "towards" position or "away" positioned relative to the driver of the motorcycle in that the housing is pivotably connected to the handlebars by the handlebar bracket assembly to be described herein.

Referring to FIG. 2, the housing unit 6 contains a radio 7 with appropriate tuning devices 8. The housing has an upper position 9 and a lower portion 10 which may be but are not necessarily of the same mold. A lower mounting bracket, portion 11 of the housing is shown which can be, but need not, part of the same plastic mold. The housing mounting bracket 11 contains appropriate openings for insertion of a mounting system. The particular embodiment here shows openings for support rod 14 and for insertion of tightening bolts 13 and nuts 15. As can be seen in FIG. 7, the bracket 11 contains a hollow channel for insertion of rod 14 and openings of bolt 13 and nut 15. There is a "slit" beginning at the bottom of the bracket and extending to the opening for rod 14 so that the bracket is flexible and may be tightened or loosened depending on whether it is desired to contain rod 14 or remove rod 14 from the housing unit. When it is desired that the housing unit be removed from the motorcycle, the bolts are loosened and the housing removed and when it is desired to contain the housing unit, bolt 13 is tightened for tight fit of the bracket assembly onto rod 14. Additionally, it can be seen that the housing can be positioned along the rod at varying desirable points by tightening and loosening bolts 13 and adjusting the housing mounting bracket along rod 14. Rod 14 is shown bent but can, of course, be straight or of generally any shape. Rod 14 is inserted in a handlebar bolt 17, which, in turn, is positioned tightly onto the handlebar 2. The handlebar mounting bracket 16 has two openings, one for the handlebar and one for the bolt 17 and nut 18. Bolt 17 is an unusually large bolt sufficient to enclose the inserted rod 14. The handlebar bracket assembly is shown in detail in FIG. 4 and FIG. 6. FIG. 6 shows the bracket as a generally U-shaped element with openings for the nut and bolt with miscellaneous auxiliary elements such as tightening brackets 19, spacers 20 and a lockwasher 21. It can be seen that if one loosens the bolt 17 from nut 18 that the rod 14 may be positioned at different angles to the handlebar 2. In FIG. 3, the bracket is shown at right angles to the main portion of handlebar 2 whereas 2 the rod is shown at an approximately 45-degree angle. This angle can be adjusted by easily adjusting the handlebar bracket assembly shown in FIG. 6. Plus the housing unit can be pivotably positioned about the handlebars for adjustment of position. Furthermore, rod 14 can be moved up and down in relation to the handlebars for further variation of position of the housing unit for clear view of the critical instruments.

The housing unit may contain an Eight (8)-track cassette or other such tape recording instruments as well as a radio, stereo, C.B. or the like and it can be seen that the housing can be utilized as to contain any number of different electronic or electrical communication devices. In the embodiment shown, the housing unit contains two speakers. It is preferred that the speakers be protected from adverse weather conditions such as rain, snow and other precipitation and thus it is preferred that the speakers be recessed into the housing unit so that any precipitation does not enter into the speakers.

I claim:

1. A housing and mounting system for stereos, radios, mobile communication broadcasting systems, and the like, with their related units for motorcycle comprising:
  (a) A plastic hollow housing unit suitably shaped to contain a stereo, radio, C.B. or the like with necessary auxiliary elements; and
  (b) (Means to support said housing unit and connect said unit to the handlebars of a motorcycle (.) comprising two or more support arms with means to connect such support arms to said housing unit and means to connect said support arms to the handlebars of a motorcycle.) Two or more support arms;
  (c) Means to connect said support arms to said housing unit comprising two housing brackets connected to or integral with said housing unit;
  (d) Said housing brackets containing a channel and appropriate nuts and bolts to contain said support arms insertable in said channel.

2. The device of claim 1 wherein two housing brackets are integral with the housing.

3. Device of claim 1 wherein said arms are connected to the handlebars by means of a handlebar bracket assembly pivotably connected and positioned on the handlebars.

4. The device of claim 3 wherein the housing shaped so that the stereo speakers are separated from one another for stereo effect.

* * * * *